(12) United States Patent
Huang

(10) Patent No.: US 8,752,997 B2
(45) Date of Patent: Jun. 17, 2014

(54) BACKLIGHT MODULE AND METHOD FOR COATING A THERMAL CONDUCTING MATERIAL ON THE BACKLIGHT MODULE

(75) Inventor: Jianfa Huang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 312 days.

(21) Appl. No.: 13/260,325

(22) PCT Filed: May 11, 2011

(86) PCT No.: PCT/CN2011/073940
§ 371 (c)(1),
(2), (4) Date: Sep. 25, 2011

(87) PCT Pub. No.: WO2012/145941
PCT Pub. Date: Nov. 1, 2012

(65) Prior Publication Data
US 2012/0275138 A1 Nov. 1, 2012

(30) Foreign Application Priority Data
Apr. 28, 2011 (CN) .......................... 2011 1 0108698

(51) Int. Cl.
*F21V 7/04* (2006.01)
(52) U.S. Cl.
USPC ............................ 362/632; 362/633; 362/634

(58) Field of Classification Search
USPC .................................................. 362/632–634
See application file for complete search history.

(56) References Cited

U.S. PATENT DOCUMENTS

| 2009/0096957 | A1 | 4/2009 | Hiyama et al. | |
| 2009/0309116 | A1* | 12/2009 | Kato et al. | 257/98 |
| 2010/0103661 | A1* | 4/2010 | Chiou et al. | 362/231 |

FOREIGN PATENT DOCUMENTS

| CN | 101017282 A | 8/2007 |
| CN | 101070448 A | 11/2007 |
| CN | 101290429 A | 10/2008 |
| CN | 101338869 A | 1/2009 |
| CN | 102003662 A | 4/2011 |
| JP | 2008299182 A | 12/2008 |

* cited by examiner

*Primary Examiner* — William Carter
(74) *Attorney, Agent, or Firm* — Mark M. Friedman

(57) ABSTRACT

The present invention proposes a backlight module which includes a back frame and at least one light bar. The back frame is coated with a specific thermal conducting material. The thermal conducting material may form various shapes on the back frame according to locations where the at least one light bar is disposed. Thermal energy produced by the at least one light bar is escaped via the thermal conducting material with various shapes, so that temperature can be uniform across the back frame.

14 Claims, 4 Drawing Sheets

BACKLIGHT MODULE AND METHOD FOR COATING A THERMAL CONDUCTING MATERIAL ON THE BACKLIGHT MODULE

BACKGROUND OF THE INVENTION

1. Field of the Invention

The present invention relates to a backlight module and a method for coating a thermal conducting material on the backlight module, and more particularly, to a backlight module where the thermal conducting material is coated on specific areas of the back frame.

2. Description of the Prior Art

An advanced monitor with multiple functions is an important feature for use in current consumer electronic products. Liquid crystal displays (LCDs) which are colorful monitors with high resolution are widely used in various electronic products such as monitors for mobile phones, personal digital assistants (PDAs), digital cameras, laptop computers, and notebook computers.

A backlight module is one of the basic components of a liquid crystal display (LCD). Liquid crystals cannot emit light, so only through light sources provided by the backlight module can a desired image be shown. The operating principle of the backlight module is that light produced by backlight sources enters a light guide plate (LGP) and is guided to be a flat light source to ensure uniform brightness. Backlight sources used in the backlight module generally include cold cathode fluorescent lamps (CCFLs) and lighting emitting diodes (LEDs). Compared with traditional fluorescent tube lamps, LEDs have the characteristics of eco-friendliness, a small volume, a long product life, easy driving, low power consumption, and excellent seismic resistance. Owing to these merits, LEDs have gradually replaced traditional fluorescent tube lamps in recent years.

In a backlight module using LEDs as backlight sources, thermal energy produced by the LED backlight sources can be conducted outside of the backlight module through the back frame to dissipate heat. But the temperature is not uniform across the back frame during the process of heat dissipation; instead, the temperature differs from one area of the back frame to another area. Accordingly, stress is produced because of thermal expansion caused by the differences in temperature.

The stress has two defects. One is that optical properties of an optical film and an LGP are affected, causing the optical film and the LGP to produce birefringence and further causing mura (i.e., uneven color distribution) once images are shown on the LCD screen. The other is that an LGP and a back frame may be thus deformed, further affecting light transmission and illumination uniformity of the LGP.

Therefore, there is a need for the IT industry to design a backlight module capable of keeping temperatures uniform during the process of heat dissipation to avoid the problem occurring in the conventional technology.

SUMMARY OF THE INVENTION

Therefore, an object of the present invention is to provide a backlight module having a back frame coated with a thermal conducting material on some specific areas, so that the backlight module can keep temperatures uniform when dissipating heat, thereby resolving the problem occurring in the prior art.

According to the present invention, a backlight module comprises a back frame and a first light bar. The back frame comprises a first side and a second side which are opposite sides of the back frame. The first light bar is disposed on the first side of the back frame, and comprises a first substrate and a plurality of light-emitting diodes electrically connected to the first substrate for emitting light. The back frame is coated with a thermal conducting material for dissipating thermal energy produced by the plurality of light-emitting diodes. The thermal conducting material is coated on a first coating area on the back frame. The first coating area is an enclosed area formed by a curve and a straight line. The first straight line of the first coating area is located at the first side, and the periphery of the first curve of the first coating area protrudes toward the second side.

In one aspect of the present invention, the backlight module comprises a second light bar, disposed on the second side of the back frame, the second light bar comprises a second substrate and a plurality of light-emitting diodes electrically connected to the second substrate for emitting light. The thermal conducting material is coated on a second coating area on the back frame. The second coating area is an enclosed area formed by a curve and a straight line. The second straight line of the second coating area is located at the second side, and the periphery of the second curve of the second coating area protrudes toward the first side. The back frame further comprises a third side and a fourth side, and the first, second, third, and fourth sides serve as the four sides of the back frame. The backlight module further comprises a third light bar and a fourth light bar, disposed on the third side and the fourth of the back frame, respectively. The thermal conducting material is coated on a third coating area and a fourth coating area on the back frame. Each of the third coating area and the fourth coating area is an enclosed area formed by a curve and a straight line. The third straight line of the third coating area is located at the third side, and the periphery of the third curve of the third coating area protrudes toward the fourth side. The he fourth straight line of the fourth coating area is located at the fourth side, and the periphery of the fourth curve of the fourth coating area protrudes toward the third side.

In another aspect of the present invention, the thermal conducting material is a coating made of an infrared heat-dissipation material. A thickness of the thermal conducting material is between 0.2 and 0.3 mm. Surface roughness of the thermal conducting material is less than 10 µm.

According to the present invention, a backlight module comprises a back frame, comprising four sides and at least one light bar. The at least one light bar disposed on at least one side of the back frame, respectively. Each of the light bars comprising a substrate and a plurality of light-emitting diodes electrically connected to the substrate for emitting light. At least one thermal conducting material is coated on the back frame for forming at least one heat transferring area, and each of the heat transferring areas is disposed on one side of the back frame corresponding to each of the light bars for dissipating thermal energy produced by the plurality of light-emitting diodes.

According to the present invention, a method of coating a thermal conducting material on a backlight module is provided. The backlight module comprises a back frame and a first light bar. The back frame comprises a first side and a second side. The he first light bar is disposed on the first side of the back frame. The he method comprises the steps of defining a first coating area which is an enclosed area formed by a curve and a straight line, the first straight line of the first coating area is located at the first side, and the periphery of the first curve of the first coating area protrudes toward the second side; and painting the thermal conducting material on the first coating area.

In an aspect of the present invention, the backlight module comprises a second light bar disposed on the second side of the back frame, the method further comprises the steps of:

defining a second coating area on the back frame which is an enclosed area formed by a curve and a straight line, the second straight line of the second coating area is located at the second side, and the periphery of the second curve of the second coating area protrudes toward the first side; and painting the thermal conducting material on the second coating area.

Contrast to the prior art, the thermal conducting material is coated only on some specific areas of the back frame of the backlight module according to the present invention. These specific areas generally have higher temperatures than the other areas of the back frame in the prior art. Thus, thermal performance for the areas coated with the thermal conducting material is better, producing an obvious cooling effect when the backlight module dissipates heat via the back frame. In this way, the backlight module can keep temperatures more uniform when dissipating heat, and further can avoid stress produced due to uneven temperatures, which occurs in the prior art.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
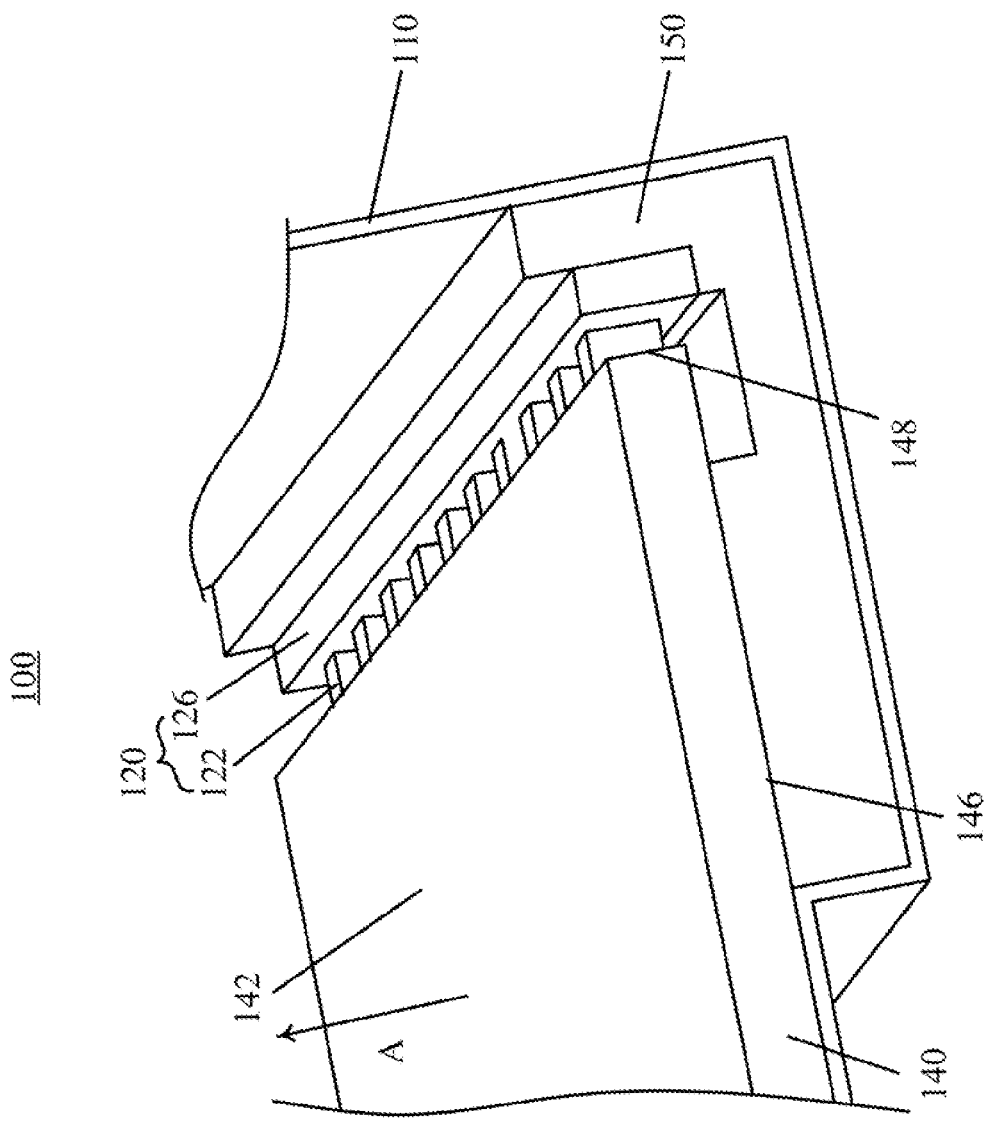
FIG. 1 is a structure diagram showing a side-edge backlight module 100 of which a thermal conducting material is coated on a specific area according to a preferred embodiment of the present invention.

Referring to FIG. 1, FIG. 1 is a structure diagram showing a side-edge backlight module 100 of which a thermal conducting material 130 is coated on a specific area according to a preferred embodiment of the present invention. The backlight module 100, capable of being used in an LCD, comprises a back frame 110, a light bar 120, a heat sink 150, and an optical component 140. The light bar 120, carried by the heat sink 150, is used to produce light. The optical component 140 guides the light emitted from the light bar 120 in a specific orientation (as arrow A is shown) to an emitting surface 142 where the light is emitted outwards. The light bar 120 produces thermal energy in operations. The thermal energy is first conducted to the back frame 110 through the heat sink 150 and then carried through the air contacting with the back frame 110 by convection to the outside.

The optical component 140 can be a light guide plate (LGP). Preferably, a plurality of circular or square-shaped diffuser structures (not shown) are formed on a bottom 146 of the optical component 140. Light produced by the light bar 120 is emitted into an incident surface 148 of the optical component 140. When passing through the plurality of diffuser structures on the bottom 146, the light undergoes reflected and is diffused everywhere. Then, since a criterion of the total internal reflection is destroyed, the reflected light is emitted upwards through the emitting surface 142 of the optical component 140, as indicated by arrow A. The optical component 140 can be evenly illuminated by utilizing the plurality of diffuser structures having a pattern design with different densities and sizes. The plurality of diffuser structures can also be structures of granular material with different indices of refraction. The light is emitted outwards evenly from the emitting surface 142 of the optical component 140 by means of light scattering by particles.

The light bar 120 comprises a substrate 126 and a plurality of light-emitting diodes (LEDs) 122 thereon. The light bar 120 is disposed on a side of the incident surface 148 of the optical component 140 for producing light. The produced light is emitted to the incident surface 148 of the optical component 140. Preferably, the substrate 126 can be a printed circuit board (PCB), a flexible printed circuit board (FPC), or a metallic substrate. The thermal conducting material 130 is coated on the specific area of the back frame 110 according to the present embodiment for dissipating heat produced by the plurality of LEDs 122. Some embodiments related to the thermal conducting material 130 coated on the specific area of the back frame 110 are described as follows.

Figure 2:
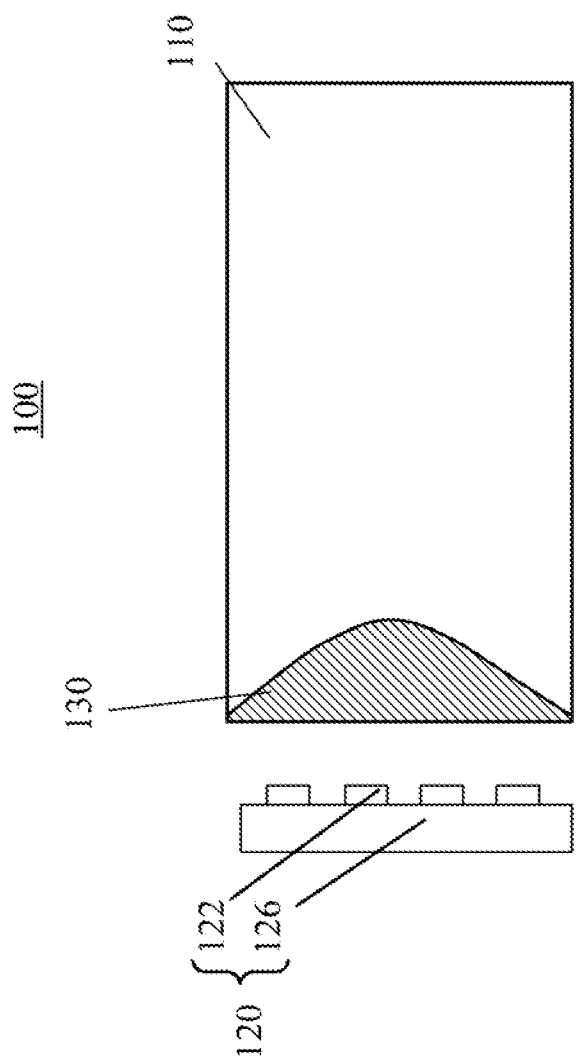
FIG. 2 is a schematic diagram showing a coating method corresponding to the backlight module according to a first embodiment of the present invention.

Referring to FIG. 2, FIG. 2 is a schematic diagram showing a coating method corresponding to the backlight module according to a first embodiment of the present invention. The light bar 120 is disposed on the left side of the backlight module 100 and no more other light bars are disposed on the other sides of the backlight module 100 in the present embodiment since the backlight module 100 is a single-sided edge-lit backlight module. Light produced by the light bar 120 passes through the optical component 140 and then is conducted evenly as a flat light source for providing brightness an LCD screen needs. The temperature of the back frame in the conventional technology is not evenly distributed. Actually, an area of the back frame closer to the light bar 120 has a higher temperature. As for a strip-shaped light bar 120, the central part of the light bar 120 has a higher temperature than the both sides. In other words, the middle part of the light bar 120 is capable of transferring thermal energy farther than the both sides. Therefore, a thermal conducting material 130 is usually coated on the back frame 110 to make temperature uniform across the back frame 110. The coating area of the thermal conducting material 130 can be regarded as a heat transferring area (i.e., the inclined area shown in FIG. 2 to FIG. 4) which has a specific location and shape to conduct thermal energy. Preferably, the thermal conducting material 130 can be an infrared coating made of an infrared heat-dissipation material which has the emissivity in the infrared beyond 0.96, the emission wavelength from 750 to 16000 nm, and power emissivity more than 400 watts per square meter.

In addition, thermal radiation has to be taken into considerations for the coating area coated with the thermal conducting material 130. A temperature difference exists between an area coated with the thermal conducting material 130 and an area where no the thermal conducting material 130 is coated. According to the Stefan-Boltzmann law, $R = \sigma T^4$, where R is the total energy radiated per unit surface area of an object per unit time, T is the absolute temperature of the object, and σ represents the Stefan-Boltzmann constant. The closer the thermal conducting material 130 coated on an area of the back frame 110 The thermal conducting material 130 coated on an area of the back frame 110 closer to the central part of the light bar 120 may radiates more thermal energy than the thermal conducting material 130 coated on an area of the back frame 110 farther from the central part of the light bar 120 radiates. On the other hand, thermal conductivity of the thermal conducting material 130 is smaller than that of the metallic back frame 110, which prevents heat convection between the back frame 110 and the air. So in this preferred embodiment, the thermal conducting material 130 is coated on areas of higher temperature on the back frame 110. The effect of heat dissipation may be reduced if the thermal conducting material 130 is coated on areas of lower temperature. To optimize the efficiency of heat-dissipating, the thermal conducting material 130 is coated on specific coating specific areas of the back frame 110. The coating area is an enclosed area formed by a curve and a straight line. The straight line of the enclosed area is located near one side of the light bar 120 (i.e., the left side of the back frame 110), and the periphery of the curve of the enclosed area protrudes toward the right side of the back frame 110. Basically, the coating area is adopted based on the criterion that an area on the back frame 110 is over 40° C. before the thermal conducting material 130 is coated on the back frame 110 under a circumstance of a room temperature 25° C. The enclosed area formed by the curve and the straight line mentioned above is merely one of the embodiments. Coating areas with various shapes are preferably formed according to different distributions of temperatures. For example, coating areas are changed correspondingly according to distributions of temperatures if the structure of the backlight module as well as the location where the light sources are disposed varies.

Since the thermal conducting material 130 is distributed on the area of higher temperature, the thermal performance becomes better, leading to the cooling effect to be more obvious when the backlight module performs heat dissipation. In this way, the difference between temperature of the coating area and temperature of the other area can be reduced, helping the backlight module 100 keep an evener temperature during the process of heat dissipation and further, avoiding stress produced due to uneven temperatures, which is a problem occurring in the conventional technology.

Figure 3:
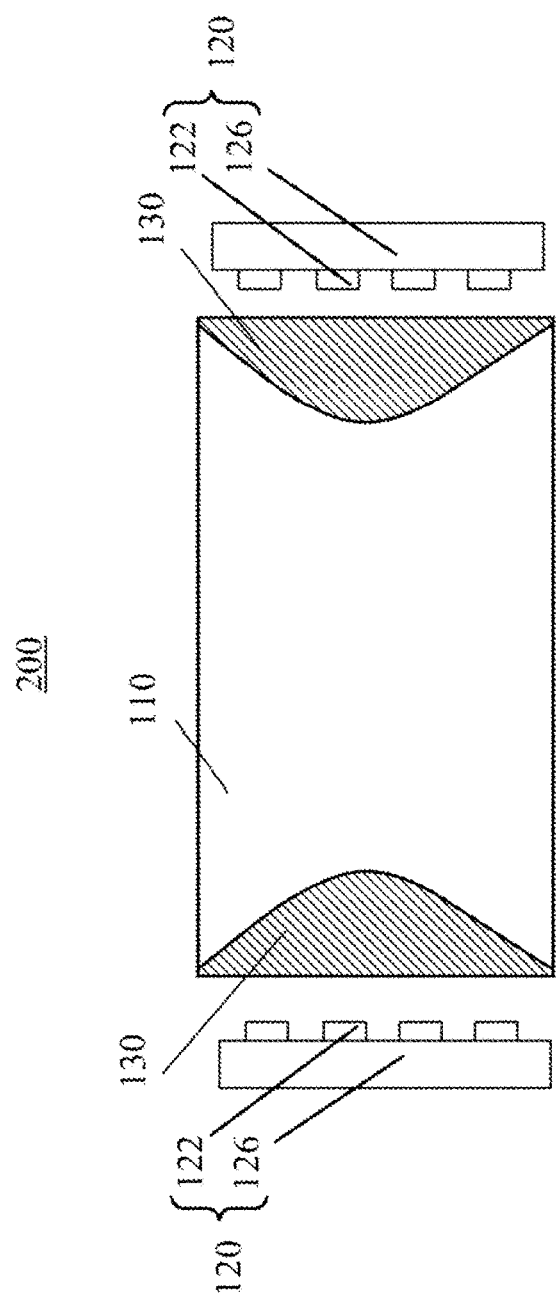
FIG. 3 is a schematic diagram showing a coating method corresponding to the backlight module according to a second embodiment of the present invention.

Referring to FIG. 3, FIG. 3 is a schematic diagram showing a coating method corresponding to a side-edge backlight module 200 according to a second embodiment of the present invention. The backlight module 200 comprises a back frame 110 and two light bars 120. It is notified that the two light bars 120 are disposed on the right side and left side of the backlight module 200, respectively, while no other light bars 120 are disposed on either the upper side or the lower side of the back light module 200 in the present embodiment. In addition, functions and operations of the back frame 110 and the two light bars 120 in the present embodiment are the same as those in the first embodiment, so no further details are provided hereafter.

Please continue to refer to FIG. 3. The thermal conducting material 130 is also coated on the back frame 110 according to the present embodiment. The difference between the present embodiment and the first embodiment lies in areas where the thermal conducting material 130 is coated. As FIG. 3 shows, in addition to the coating area of the thermal conducting material 130 shown in the first embodiment, an additional coating area at the right side is also included. Similarly, another light bar 120 is disposed on the right side according to the present embodiment. The additional light bar 120 also causes an increase in temperature of the back frame 110. So the area of higher temperature should also be coated with the thermal conducting material 130. Thus, a corresponding coating area coated with the thermal conducting material 130 is added at the right side symmetrically. The shape of the coating area at the right side is roughly similar to that at the left side. While the invention has been disclosed in connection with the embodiment shown and described in detail, various modifications and improvements thereon will become readily apparent to those ordinarily skilled in the art, so no further details are provided hereafter.

Figure 4:
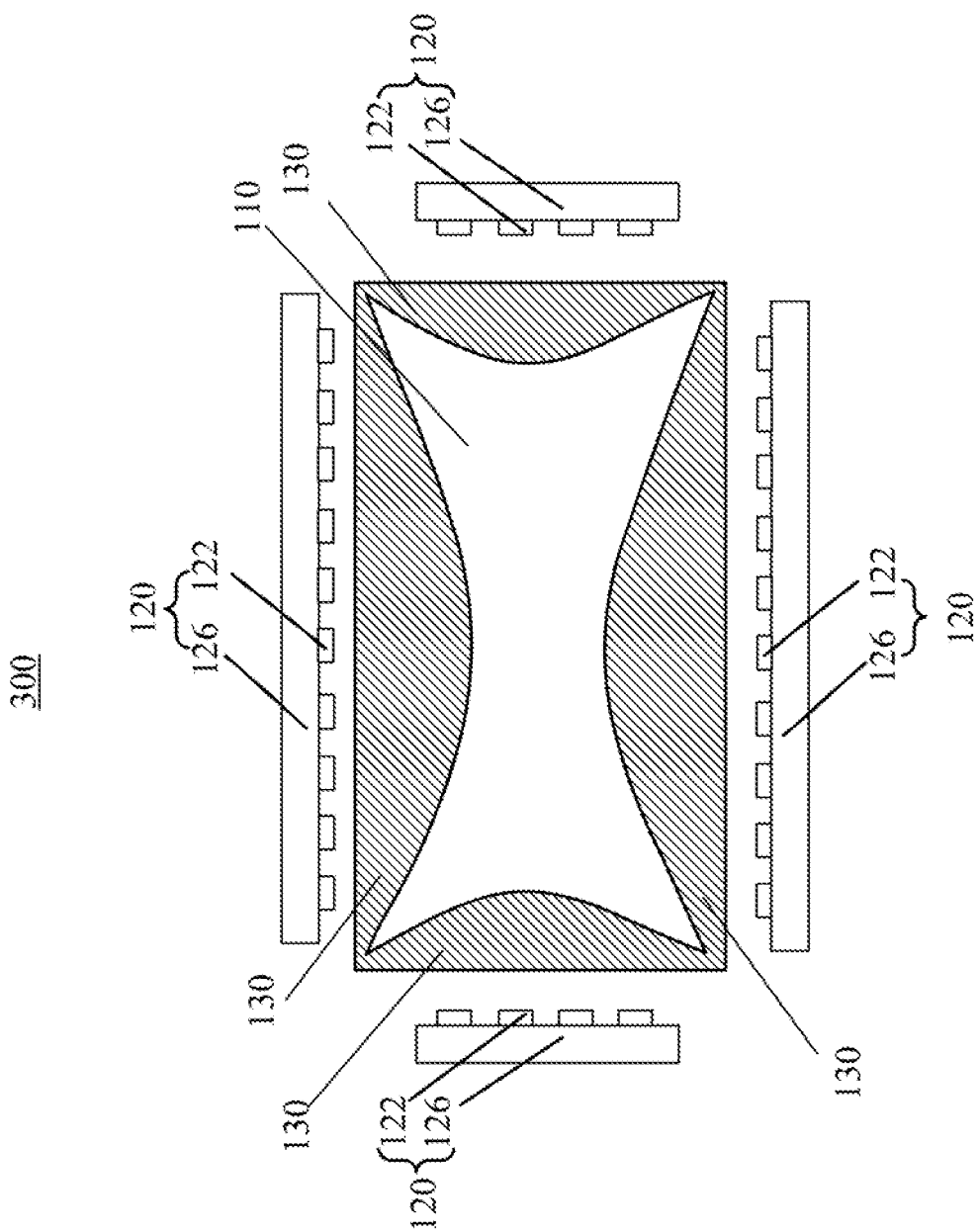
FIG. 4 is a schematic diagram showing a coating method corresponding to a side-edge backlight module according to a third embodiment of the present invention.

Referring to FIG. 4, FIG. 4 is a schematic diagram showing a coating method corresponding to a side-edge backlight module 300 according to a third embodiment of the present invention. The backlight module 300 comprises a back frame 110 and four light bars 120. It is notified that the backlight module 300 is a quadrilateral side-edge one according to the present embodiment. In other words, the four light bars 120 are disposed on the right, left, upper, and lower sides of the back frame 110, respectively. Therefore, it is needed to adjust the areas coated with the thermal conducting material 130 according to the disposition of the four light bars 120 in the present embodiment. The thermal conducting material 130 is coated on the right, left, upper, and lower sides of the back frame 110. The coating area in the present embodiment is an enclosed area formed by a curve and a straight line, and the periphery of the curve protrudes toward the opposite side according to distributions of temperature. As the person skilled in the art is aware, the way to decide the coating areas in the present embodiment is similar to that in the first embodiment, so no further details are provided hereafter.

In addition, the surface of the back frame 110 coated with the thermal conducting material 130 becomes rough. The uneven thickness of the back frame 110 affects heat dissipation. When the surface of the back frame 110 is coated with an overabundance of thermal conducting material 130, it is not easy to dissipate heat via conduction and convection. If the surface of the back frame 110 is too rough, the effects of convection are reduced. Preferably, the thickness of the thermal conducting material 130 coated on the coating areas is between 0.2 and 0.3 mm, and surface roughness of the thermal conducting material 130 is less than 10 μm. According to the experiment, heat dissipation efficiency of this design is optimal. This is, however, merely a preferred embodiment of the present invention, instead of limiting the spirit and scope of the present invention. In practice, the thickness as well as the roughness of the thermal conducting material 130 is not limited to the numbers mentioned above.

In addition, there are several ways to coat the thermal conducting material 130 on the surface of some specific areas of the back frame 110. For example, the thermal conducting material 130 is sprayed onto the back frame 110 by using a spray gun, or the thermal conducting material 130 is brushed onto the back frame 110 by using a brush. The way of coating the thermal conducting material 130, however, is not limited in the present invention. The coating method mentioned here is merely one of the embodiments, instead of limiting the spirit and scope of the present invention.

In sum, owing to the special coating method of using the thermal conducting material 130, the back frame 110 has different efficiencies of heat dissipation in different areas. For an area of higher temperature, thermal energy is dissipated with higher efficiency of heat dissipation by means of the thermal conducting material 130. Therefore, the difference in temperature among difference areas of the back frame 110 of the backlight module in the present invention can be reduced, so that the temperature can be uniform across the back frame 110, and further, can solve the stress problem occurring in the conventional technology, improving the display effect on LCDs.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A backlight module, comprising:
   a back frame, the back frame including a flat plate and comprising a first side and a second side which are opposite sides of the back frame; and
   a first light bar, disposed on the first side of the back frame, comprising a first substrate and a plurality of light-emitting diodes electrically connected to the first substrate for emitting light;
   wherein the flat plate of the back frame is coated with a thermal conducting material for dissipating thermal energy produced by the plurality of light-emitting diodes, the thermal conducting material is coated on a first coating area on the back frame, the first coating area is an enclosed area formed by a first curve and a first straight line, the first straight line of the first coating area is located at the first side, and the periphery of the first curve of the first coating area protrudes toward the second side.

2. The backlight module as claimed in claim 1, characterized in that: the backlight module comprises a second light bar, disposed on the second side of the back frame, the second light bar comprises a second substrate and a plurality of light-emitting diodes electrically connected to the second substrate for emitting light, the thermal conducting material is coated on a second coating area on the back frame as well, the second coating area is an enclosed area formed by a second curve and a second straight line, the second straight line of the second coating area is located at the second side, and the periphery of the second curve of the second coating area protrudes toward the first side.

3. The backlight module as claimed in claim 2, characterized in that: the back frame further comprises a third side and a fourth side, and the first, second, third, and fourth sides serve as the four sides of the back frame, the backlight module further comprises a third light bar and a fourth light bar, disposed on the third side and the fourth of the back frame, respectively, the thermal conducting material is coated on a third coating area and a fourth coating area on the back frame, each of the third coating area and the fourth coating area is an enclosed area formed by a curve and a straight line, the third straight line of the third coating area is located at the third side, and the periphery of the third curve of the third coating area protrudes toward the fourth side, the fourth straight line of the fourth coating area is located at the fourth side, and the periphery of the fourth curve of the fourth coating area protrudes toward the third side.

4. The backlight module as claimed in claim 1, characterized in that: a thickness of the thermal conducting material is between 0.2 and 0.3 mm.

5. The backlight module as claimed in claim 1, characterized in that: surface roughness of the thermal conducting material is less than 10 μm.

6. The backlight module as claimed in claim 1, characterized in that: the thermal conducting material is a coating made of an infrared heat-dissipation material.

7. A backlight module, comprising:
   a back frame, the back frame including a flat plate and comprising four sides; and
   at least one light bar, the at least one light bar disposed on at least one side of the back frame, respectively, each of the light bars comprising a substrate and a plurality of light-emitting diodes electrically connected to the substrate for emitting light;
   wherein at least one thermal conducting material is coated on the flat plate of the back frame for forming at least one heat transferring area, and each of the heat transferring areas is disposed on one side of the back frame corresponding to each of the light bars for dissipating thermal energy produced by the plurality of light-emitting diodes;
   wherein the at least one heat transferring area is an enclosed area formed by a curve and a straight line, the straight line of the at least one heat transferring area is located at one of the sides, and the periphery of the curve of the at least one heat transferring area protrudes toward the center of the back frame.

8. The backlight module as claimed in claim 7, characterized in that: a thickness of the thermal conducting material is between 0.2 and 0.3 mm.

9. The backlight module as claimed in claim 7, characterized in that: surface roughness of the thermal conducting material is less than 10 μm.

10. The backlight module as claimed in claim 7, characterized in that: the thermal conducting material is a coating made of an infrared heat-dissipation material.

11. A method of coating a thermal conducting material on a backlight module, the backlight module comprising a back frame and a first light bar, the back frame including a flat plate and comprising a first side and a second side, the first light bar being disposed on the first side of the back frame, the method comprising:
   defining a first coating area on the flat plate of the back frame which is an enclosed area formed by a curve and a straight line, the first straight line of the first coating area is located at the first side, and the periphery of the first curve of the first coating area protrudes toward the second side; and
   painting the thermal conducting material on the first coating area.

12. The method of coating a thermal conducting material on a backlight module as claimed in claim 11, characterized in that the backlight module comprises a second light bar disposed on the second side of the back frame, the method comprises:
   defining a second coating area on the back frame which is an enclosed area formed by a curve and a straight line, the second straight line of the second coating area is located at the second side, and the periphery of the second curve of the second coating area protrudes toward the first side; and
   painting the thermal conducting material on the second coating area.

13. The method of coating a thermal conducting material on a backlight module as claimed in claim 11, characterized in that: a thickness of the thermal conducting material is between 0.2 and 0.3 mm and surface roughness of the thermal conducting material is less than 10 μm.

14. The method of coating a thermal conducting material on a backlight module as claimed in claim 11, characterized in that: the thermal conducting material is a coating made of an infrared heat-dissipation material.

\* \* \* \* \*